United States Patent [19]

Kioka et al.

[11] Patent Number: 5,290,896
[45] Date of Patent: Mar. 1, 1994

[54] ETHYLENE/PENTENE-1 COPOLYMER, AND ETHYLENE/PENTENE-1 COPOLYMER COMPOSITION

[75] Inventors: Mamoru Kioka; Tsuneo Yashiki; Takashi Ueda, all of Yamaguchi; Masaki Kohyama; Masaya Yamada, both of Ichihara; Seiichi Ikeyama, Yamaguchi; Yoshinori Akana, Yamaguchi; Kenji Iwata, Yamaguchi; Satoshi Matsumoto, Yamaguchi; Hideki Sakai, Yamaguchi, all of Japan

[73] Assignee: Mitsui Petrochemical Industries, Ltd., Tokyo, Japan

[21] Appl. No.: 661,256

[22] Filed: Feb. 27, 1991

[30] Foreign Application Priority Data

| Feb. 27, 1990 | [JP] | Japan | 2-46610 |
| Feb. 27, 1990 | [JP] | Japan | 2-46611 |
| Apr. 23, 1990 | [JP] | Japan | 2-106816 |
| Apr. 23, 1990 | [JP] | Japan | 2-106817 |
| Apr. 23, 1990 | [JP] | Japan | 2-106818 |
| Apr. 23, 1990 | [JP] | Japan | 2-106819 |
| Apr. 23, 1990 | [JP] | Japan | 2-106820 |

[51] Int. Cl.$^5$ ............................................ C08F 210/14
[52] U.S. Cl. ............................ 526/348; 526/125; 526/142; 526/348; 524/99; 524/128; 524/186; 524/323; 524/394; 524/400; 524/419; 524/579
[58] Field of Search ............... 526/348.6, 348, 125; 524/570, 579, 128, 186, 323, 394, 419

[56] References Cited

U.S. PATENT DOCUMENTS

B 632,416  3/1976  Anderson et al. ............ 260/88.2 F
4,330,639  5/1982  Matsuura et al. .............. 525/240
4,461,873  7/1984  Bailey et al. .
4,547,551  10/1985  Bailey et al. .
4,822,855  4/1989  Kobayashi et al. .

FOREIGN PATENT DOCUMENTS

0109779A1  5/1984  European Pat. Off. .
0141597A1  5/1985  European Pat. Off. .
0351189A2  1/1990  European Pat. Off. .
63-39942  4/1988  Japan .
42776  6/1982  Taiwan .
58926  9/1983  Taiwan .
20903047A  8/1982  United Kingdom .

OTHER PUBLICATIONS

Koptev, Chemical Abstracts, vol. 69, No. 8, p. 2658, Abstract No. 2838d, Aug. 1968.

Primary Examiner—Fred Teskin
Attorney, Agent, or Firm—Sherman and Shalloway

[57] ABSTRACT

The present invention relates to a novel ethylene/pentene-1 copolymer whose molded film has a good balance between impact resistance and tear properties and high transparency, also is prominently reduced in a variation of the transparency even after subjected to a heat treatment, and further shows high blocking resistance, provided that the copolymer fulfills specific requisites. The invention also relates to a process for the preparation of the above-mentioned ethylene/pentene-1 copolymer and a formulation of the ethylene/pentene-1 copolymer composition using a stabilizer. According to the invention, there can be obtained an ethylene/pentene-1 copolymer composition which is excellent in heat stability in the molding stage, long-term heat stability and weatherability.

27 Claims, 2 Drawing Sheets

ETHYLENE/PENTENE-1 COPOLYMER, AND ETHYLENE/PENTENE-1 COPOLYMER COMPOSITION

FIELD OF THE INVENTION

The present invention relates to an ethylene/pentene-1 copolymer and a process for the preparation of the same. More particularly, the invention relates to a novel ethylene/pentene-1 copolymer whose molded film has a good balance between impact resistance and tear properties, and high transparency, further is prominently reduced in a variation of the transparency even after subjected to a heat treatment, and furthermore shows high blocking resistance, provided that the copolymer fulfills specific requisites. The invention also relates to a process for the preparation of the above-described ethylene/pentene-1 copolymer.

Further, the present invention relates to an ethylene/pentene-1 copolymer composition, more particularly, to an ethylene/pentene-1 copolymer composition which is excellent in heat stability in the molding stage, long-term heat stability and weatherability.

BACKGROUND OF THE INVENTION

Linear low-density polyethylene (LLDPE), that is a copolymer of ethylene and α-olefin, shows higher impact strength when molded into a film, as compared with conventional low-density polyethylene (LDPE) obtained by the high pressure process, so that the linear low-density polyethylene has been broadly used as a film-forming material.

A film obtained from an ethylene/butene-1 copolymer (i.e., an example of the linear low-density polyethylenes) is excellent in tear properties because of its adequate tear strength, but is somewhat low in the impact strength.

A film obtained from a copolymer of ethylene and α-olefin having 6 or more carbon atoms (i.e, other example of the linear low-density polyethylene) is excellent in the impact strength, but has such a problem that the film cannot be easily torn because of too high tear strength. In other words, the film obtained from such copolymer is bad in the tear properties.

Accordingly, eagerly desired are ethylene/α-olefin copolymers which can provide films of high impact strength and excellent tear properties. For the purpose of more improving the impact strength of films, a method of using α-olefin having larger number of carbon atoms has been tried. However, the method sometimes causes such problems that the blocking resistance of the resulting film is much lowered and the transparency of the film is markedly reduced when the film is subjected a heat treatment. Especially in the case of a lamination film, after the film-forming procedure, the obtained film is generally subjected to an aging procedure at approx. 40° C. to enhance the dimensional stability, but in this aging procedure, the film sometimes turns white so that the transparency is reduced.

The present inventors have earnestly studied to solve the above-mentioned problems accompanied by the ethylene/α-olefin copolymer films. As a result, they have found that if an ethylene/pentene-1 copolymer having been obtained by copolymerizing ethylene and pentene-1 under specific conditions and fulfilling specific requisites is molded into a film, the resulting film is excellent in blocking resistance as well as in a balance between impact strength and tear properties and is remarkably prevented from lowering of transparency caused by a heat treatment. Thus, ethylene/pentene-1 copolymers and processes for the preparation of the same according to the invention have been accomplished.

The present inventors have also found that an ethylene/pentene-1 copolymer composition obtained by adding a specific stabilizer to the above-mentioned ethylene/pentene-1 copolymer is excellent in heat stability in the molding stage, long-term heat stability and weatherability, and that a molded product obtained from the copolymer composition can keep high impact strength and good tear properties both inherently belonging to the ethylene/pentene-1 copolymer. Thus, ethylene/pentene-1 copolymer compositions according to the invention have been accomplished.

OBJECT OF THE INVENTION

The present invention is to solve the above-mentioned problems existing in the prior arts, and it is an object of the invention is to provide a novel ethylene/pentene-1 copolymer whose molded film has a good balance between impact resistance and tear properties, and high transparency, also is prominently reduced in a variation of the transparency even after subjected to a heat treatment, and further shows high blocking resistance.

It is another object of the invention to provide a process for the preparation of the above-mentioned ethylene/pentene-1 copolymer.

It is a further object of the invention to provide an ethylene/pentene-1 copolymer composition having high heat stability in the molding stage, excellent long-term heat stability and high weatherability, which is very suitable for forming a molded product capable of keeping high impact strength and excellent tear properties both inherently belonging to the ethylene/pentene-1 copolymer.

SUMMARY OF THE INVENTION

The ethylene/pentene-1 copolymer of the invention is a copolymer of ethylene and pentene-1, and is characterized in that the copolymer fulfills the following requisites (A) to (E):

(A) a melt flow rate of the copolymer as measured according to ASTM D 1238E is in the range of 0.01 to 100 g/10 min;

(B) a density of the copolymer as measured according to ASTM D 1505 is in the range of 0.87 to 0.94 g/cm$^3$;

(C) the copolymer contains constitution units derived from pentene-1 in an amount of 1 to 25 % by weight;

(D) in the case that the copolymer is subjected to cast molding to prepare a film having a thickness of 40 μm, a ratio (RS) of impact strength of the film to tearing strength of the film in the take-off direction of the film satisfies the following formula:

$$RS \geq -20 \log MFR - 1000d + 968$$

wherein MFR represents a melt flow rate of the copolymer, and d represents a density of the copolymer; and (E) in the case that the copolymer is melted at 200° C., then slowly cooled to 50° C. at a cooling rate of 0.31° C./min and crystallized to prepare a sheet sample having a thickness of 0.5 mm, a DSC melt-peak pattern of the sample obtained when the sample is heated from 10° to 200° C. at a heating rate of 10° C./min using DSC has two melt peaks, and a ratio (Hh/Hl) of a height of the peak (Hh) on the higher temperature side to a height of the peak (Hl) on the lower temperature side and the density of the copolymer satisfy the following formula:

$$0 < Hh/Hl < 60d - 52.0$$

wherein Hh represents a peak height on the higher temperature side, Hl represents a peak height on the lower temperature side, and d represents a density of the copolymer.

The ethylene/pentene-1 copolymer of the invention fulfills the above-mentioned various requisites, so that when the copolymer is molded into a film, the obtained film is excellent in the impact resistance and in the transparency. Further, the transparency of the film is hardly varied even after the film is subjected to a heat treatment. Furthermore, the film is also excellent in the blocking resistance.

The process for the preparation of an ethylene/pentene-1 copolymer according to the invention is characterized in that an ethylene/pentene-1 copolymer having a density of 0.87 to 0.94 g/cm³ is prepared by copolymerizing at least ethylene and pentene-1 under such conditions that not less than 80 % by weight of the resulting copolymer is dissolved in a reaction solvent or melted, and that the obtained copolymer fulfills the following requisites (C) and (D):

(C) the copolymer contains constitution units derived from pentene-1 in an amount of 1 to 25 % by weight; and (D) in the case that the copolymer is subjected to cast molding to prepare a film having a thickness of 40 μm, a ratio (RS) of impact strength of the film to tearing strength of the film in the take-off direction of the film satisfies the following formula:

$$RS \geq -20 \log MFR - 1000d + 968$$

wherein MFR represents a melt flow rate of the copolymer, and d represents a density of the copolymer.

According to the process for the preparation of an ethylene/pentene-1 copolymer of the invention, ethylene and pentene-1 are copolymerized under specific conditions, so that the obtained ethylene/pentene-1 copolymer fulfills the above-mentioned specific requisites. When the obtained copolymer is molded into a film, the film is excellent in the impact resistance and in the transparency. Further, the transparency of the film is hardly varied even after the film is subjected to a heat treatment. Furthermore, the film is also excellent in the blocking resistance.

The ethylene/pentene-1 copolymer composition of the invention is characterized in that the composition comprises an ethylene/pentene-1 copolymer (I) and at least one compound (II) selected from the group consisting of a phenolic stabilizer (a), an organic phosphite stabilizer (b), a thioether stabilizer (c), a hindered amine stabilizer (d) and a metal salt of a higher aliphatic acid (e); the ethylene/pentene-1 copolymer (I) being obtained by copolymerization of ethylene and pentene-1 and fulfilling the following requisites (A) to (E):

(A) a melt flow rate of the copolymer as measured according to ASTM D 1238E is in the range of 0.01 to 100 g/10 min;

(B) a density of the copolymer as measured according to ASTM D 1505 is in the range of 0.87 to 0.94 g/cm³;

(C) the copolymer contains constitution units derived from pentene-1 in an amount of 1 to 25 % by weight;

(D) in the case that the copolymer is subjected to cast molding to prepare a film having a thickness of 40 μm, a ratio (RS) of impact strength of the film to tearing strength of the film in the take-off direction of the film satisfies the following formula:

$$RS \geq -20 \log MFR - 1000d + 968$$

wherein MFR represents a melt flow rate of the copolymer, and d represents a density of the copolymer; and (E) in the case that the copolymer is melted at 200° C., then slowly cooled to 50° C. at a cooling rate of 0.31° C./min and crystallized to prepare a sheet sample having a thickness of 0.5 mm, a DSC melt-peak pattern of the sample obtained when the sample is heated from 10° to 200° C. at a heating rate of 10° C./min using DSC has two melt peaks, and a ratio (Hh/Hl) of a height of the peak (Hh) on the higher temperature side to a height of the peak (Hl) on the lower temperature side and the density of the copolymer satisfy the following formula.

$$0 < Hh/Hl < 60d - 52.0$$

wherein Hh represents a peak height on the higher temperature side, Hl represents a peak height on the lower temperature side, and d represents a density of the copolymer.

DETAILED DESCRIPTION OF THE INVENTION

The ethylene/pentene-1 copolymers of the present invention are illustrated below in more detail.

The ethylene/pentene-1 copolymers of the present invention are random copolymers which can be obtained by copolymerizing ethylene and pentene-1 under specific conditions. In the preparation of the ethylene/pentene-1 copolymers of the present invention, small amounts of other α-olefins or polyenes in addition to ethylene and pentene-1 may be copolymerized. Examples of such α-olefins include propylene, 2-methylpropylene, 1-butene, 1-hexene, 4-methyl-1-pentene, 3-methyl-1-pentene, 1-octene, 1-nonene, 1-decene, 1-undecene and 1-dodecene. Examples of the polyenes include butadiene, isoprene, 1,4-hexadiene, dicyclopentadiene and 5-ethylidene-2-norbornene.

The ethylene/pentene-1 copolymers of the present invention have a melt flow rate (MFR) of 0.01 to 100 g/10 min, preferably 0.05 to 50 g/10 min as measured according to ASTM D 1238E. When MFR is lower than 0.01 g/10 min, the moldability of the resulting copolymers is lowered and the transparency of films obtained from the copolymers is liable to be lowered, while when MFR is higher than 100 g/10 min, mechanical strength is apt to be lowered.

The ethylene/pentene-1 copolymers of the present invention have a density of 0.87 to 0.94 g/cm³, preferably 0.88 to 0.93 g/cm³ as measured according to ASTM D 1505.

The ethylene/pentene-1 copolymers of the present invention comprise 1 to 25% by weight, preferably 4 to 23% by weight, particularly preferably 6 to 20% by weight of a constitution unit derived from pentene-1 and 75 to 99% by weight, preferably 77 to 96% by weight, particularly preferably 80 to 94% by weight of a constitution unit derived from ethylene.

The ethylene/pentene-1 copolymers may contain not more than 10% by weight, preferably not more than 5% by weight, particularly preferably not more than 3% by weight of a constitution unit derived from one or more α-olefins or polyenes in addition to ethylene and pentene-1 as mentioned above.

Figure 1:
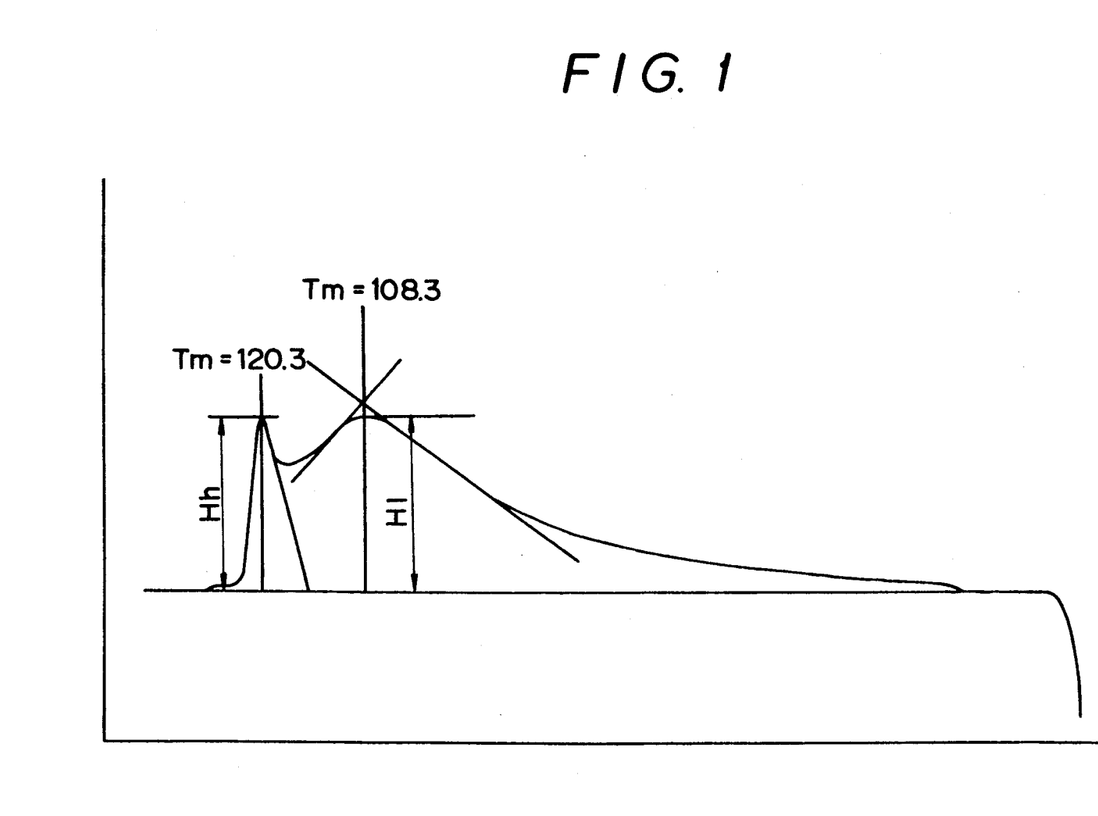
FIG. 1 is a DSC melt-peak pattern obtained by measuring "ultra-slowly cooled sample" of an ethylene/pentene-1 copolymer prepared by the process of the invention under conventional measuring conditions.
Figure 2:
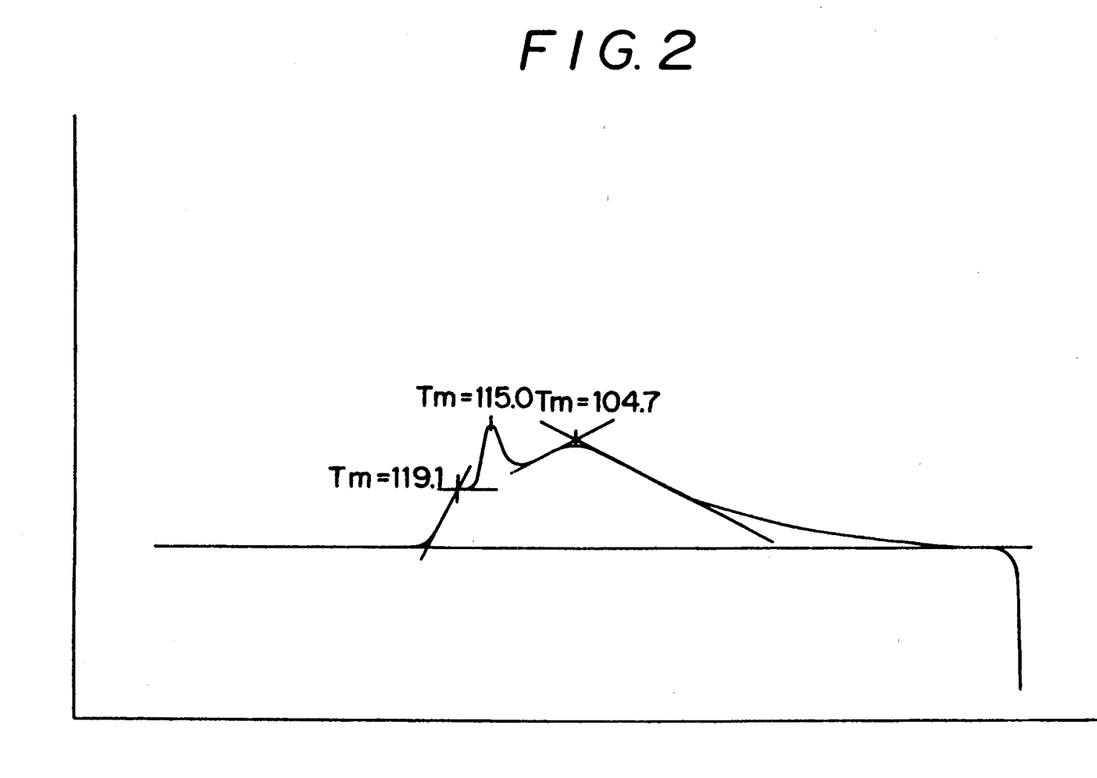
FIG. 2 is a DSC melt-peak pattern obtained by measuring conventionally cooled sample of an ethylene/pentene-1 copolymer prepared by the process of the invention under conventional measuring conditions.

The ethylene/pentene-1 copolymer of the present invention was molten by elevating the temperature to 200° C. and crystallized by cooling it at a cooling rate of 10° C./min to obtain a sheet of 0.5 mm in thickness as a sample. The DSC melt-peak pattern of the sheet obtained by elevating the temperature from 10° C. to 200° C. at a heating rate of 10° C./min by using DSC shows three peaks (FIG. 2). On the other hand, the ethylene/pentene-1 copolymer of the present invention was molten by elevating the temperature to 200° C. and then crystallized by ultra-slowly cooling it at a cooling rate of 0.31° C./min to 50° C. to obtain a sheet of 0.5 mm in thickness as a sample (the thus-obtained sample is hereinafter referred as ultra-slowly cooled sample). The DSC melt-peak pattern of the sheet obtained by elevating the temperature from 10° C. to 200° C. at a heating rate of 10° C./min by using DSC has two melt-peaks wherein the relationship between the ratio of Hh/Hl (wherein Hh is a peak height on the higher temperature side and Hl is a peak height on the lower temperature side) and the density (d) of the copolymer fulfills the following formula [1] (FIG. 1).

$$0 < Hh/Hl < 60d - 52.0 \quad [1]$$

Preferably, $$0 < Hh/Hl < 40d - 34.5 \quad [1']$$

Particularly preferably, $$0 < Hh/Hl < 1 \quad [1'']$$

wherein Hh represents a peak height on the higher temperature side, Hl represents a peak height on the lower temperature side, and d is the density of the copolymer.

The analysis of the DSC melt-peak pattern of the ultra-slowly cooled sample is made in the following manner. A tangent line is drawn on the foot of the higher temperature side of the melt-peak on the higher temperature side by starting from a point on the melt curve at 30° C. The tangent line is referred to as a base line. A perpendicular line is drawn from the highest point of the peak toward the base line, and the distance between the intersecting point and the highest point of the peak is referred to as the peak height.

The ratio (RS) of the impact strength of a film of 40 μm in thickness to the tear strength thereof in the take-off direction is represented by the following formula [2], said film being obtained by casting the ethylene/pentene-1 copolymer having the above-mentioned characteristics according to the present invention.

$$RS \geq -20 \log MFR - 1000d + 968 \quad [2]$$

wherein MFR is the melt flow rate of the copolymer and d is the density of the copolymer. Preferably, $$RS \geq -20 \log MFR - 1000d + 973 \quad [2']$$

Particularly preferably, $$200 \geq RS \geq -20 \log MFR - 1000d + 975 \quad [2'']$$

When the ratio (RS) of the impact strength to the tear strength is lower than $(-20 \log MFR - 1000d + 968)$, the resulting film has poor tear properties, though it has a high impact strength, or the resulting film is inferior in impact strength, though it has good tear properties. The film of 40 μm in thickness, used for the measurement of the RS value, is a film prepared by molding the ethylene/pentene-1 copolymer under the following conditions into a film by using a T-die film molding machine equipped with a 65 mmφ extruder.

Molding conditions:
Resin temperature: 220° to 240° C.
Chill roll temperature: 30° to 40° C.
Film-forming rate: 20 to 30 m/min
Draft ratio (film thickness/lip opening): 0.05 to 0.07

The cast film of 40 μm in thickness, obtained by processing the copolymer of the present invention in the manner mentioned above has an impact strength of generally not lower than 1000 kg·cm/cm, preferably not lower than 1200 kg·cm/cm.

It is preferred that the tear strength ($T_{MD}$) of said film in the take-off direction and the melt flow rate (MFR) of the ethylene/pentene-1 copolymer fulfills the relationship represented by the following formula [3].

$$\text{Log } T_{MD} - 0.37 \log MFR - 5.1d + 6.72 \quad [3]$$

wherein d is the density of the copolymer.
Preferably, $$\text{Log } T_{MD} - 0.37 \log MFR - 5.1d + 6.65 \quad [3']$$

Particularly preferably, $$\text{Log } T_{MD} - 0.37 \log MFR - 5.1d + 6.59 \quad [3'']$$

Films excellent in impact strength as well as tear properties can be obtained from the ethylene/pentene-1 copolymers which fulfills the relationship represented by the above formula [3] with respect to the tear strength ($T_{MD}$) of the film in the take-off direction and MFR.

Pressed sheets of 2 mm in thickness obtained by molding the ethylene/pentene-1 copolymers of the present invention as mentioned above according to ASTM D 1928 have stress cracking resistance [SC resistance (ESCR), measured according to ASTM D 1692, antalocks 100%, 50° C.] of at least 10 hr and satisfy the relationship represented by the following formula [4-a].

$$ESCR \geq 0.7 \times 10^4 (\log 80 - \log MFR)^3 (0.952 - d) \quad [4\text{-}a]$$

wherein $2.0 \leq MFR \leq 5.0$ and d is the density of the copolymer.
Preferably, $$ESCR \geq 0.9 \times 10^4 (\log 80 - \log MFR)^3 (0.952 - d) \quad [4'\text{-}a]$$

Particularly, $$ESCR \geq 1.1 \times 10^4 (\log 80 - \log MFR)^3 (0.952 - d) \quad [4''\text{-a}]$$

Further, pressed sheets of 2 mm in thickness, obtained by molding the ethylene/pentene-1 copolymers of the present invention according to ASTM D 1928 have stress cracking resistance [SC resistance (ESCR), measured according to ASTM D 1692, antalocks 10%, 50° C.] of at least 20 hr and satisfy the relationship represented by the following formula [4-b]

$$ESCR \geq 1.4 \times 10^4 (\log 40 - \log MFR)^2 (0.952 - d) \quad [4\text{-b}]$$

wherein $1.0 \leq MFR \leq 20$ and d is the density of the copolymer.

Preferably, $$ESCR \geq 1.7 \times 10^4 (\log 40 - \log MFR)^2 (0.952 - d) \quad [4'\text{-b}]$$

Particularly preferably, $$ESCR \geq 2.0 \times 10^4 (\log 40 - \log MFR)^2 (0.952 - d) \quad [4''\text{-a}]$$

Furthermore, pressed sheets of 2 mm in thickness, obtained by molding the ethylene/pentene-1 copolymers of the present invention according to ASTM D 1928 have stress cracking resistance [SC resistance (ESCR), measured according to ASTM D 1692, antalocks 10%, 60° C.] of at least 50 hr and satisfy the relationship represented by the following formula [4-c].

$$ESCR \geq 0.50 \times 10^4 (\log 100 - \log MFR)(0.952 - d) \quad [4\text{-c}]$$

wherein $0.1 \leq MFR \leq 5$ and d is the density of the copolymer.

Preferably, $$ESCR \geq 0.65 \times 10^4 (\log 100 - \log MFR)(0.952 - d) \quad [4'\text{-c}]$$

Particularly preferably, $$ESCR \geq 0.80 \times 10^4 (\log 100 - \log MFR)(0.952 - d) \quad [4''\text{-c}]$$

Moreover, it is preferred that the haze of the above-mentioned pressed sheets and the melt flow rate (MFR) of the ethylene/pentene-1 copolymers satisfy the relationship represented by the following formula (5).

$$\text{Log } HAZE \leq 15d - 0.45 \log MFR - 12.23 \quad [5]$$

wherein d is the density of the copolymer.

More preferably, $$\text{Log } HAZE \leq 15d - 0.45 \log MFR - 12.26 \quad [5']$$

Particularly preferably, $$\text{Log } HAZE \leq 15d - 0.45 \log MFR - 12.30 \quad [5'']$$

The press sheets of 2 mm in thickness, used for the measurements of the above-mentioned physical properties were prepared from the ethylene/pentene-1 copolymers according to ASTM D 1928.

The measurement of HAZE was made according to ASTM D 1003.

It is preferred that the ethylene/pentene-1 copolymers having such characteristics as mentioned above according to the present invention are prepared according to a copolymerization process described hereinafter.

Now, the process for preparing the ethylene/pentene-1 copolymers of the present invention is illustrated below in detail.

The process for preparing the ethylene/pentene-1 copolymers of the present invention is characterized by copolymerizing ethylene and pentene-1 in the presence of an olefin polymerization catalyst described hereinafter under specific conditions.

Examples of the olefin polymerization catalyst which can be used in the process for preparing the ethylene/pentene-1 copolymers of the present invention include olefin polymerization catalysts formed from [A] a titanium catalyst component in a liquid form comprising a halogen-containing magnesium compound, oleyl alcohol and a titanium compound, and [B] a halogenated organoaluminum compound.

Examples of the halogen-containing magnesium compound include magnesium chloride, magnesium bromide, magnesium iodide and magnesium fluoride. Of these compounds, magnesium chloride is particularly preferable.

The titanium compound includes tetravalent titanium compounds represented by the formula $Ti(OR)_g X_{4-g}$ (wherein R is a hydrocarbon group, X is halogen and g is a number of 0 to 4).

Concrete examples of these titanium compounds include titanium tetrahalides such as $TiCl_4$, $TiBr_4$ and $TiI_4$; alkoxytitanium trihalides such as
$Ti(OCH_3)Cl_3$,
$Ti(OC_2H_5)Cl_3$,
$Ti(O\text{-}iC_3H_7)Cl_3$,
$Ti(O\text{-}nC_4H_9)Cl_3$,
$Ti(OC_2H_5)Br_3$,
$Ti(O\text{-}iC_3H_7)Br_3$, and
$Ti(O\text{-}iC_4H_9)Br_3$;
alkoxytitanium dihalides such as
$Ti(OCH_3)_2Cl_2$,
$Ti(OC_2H_5)_2Cl_2$,
$Ti(O\text{-}iC_3H_7)_2Cl_2$,
$Ti(O\text{-}nC_4H_9)_2Cl_2$, and
$Ti(OC_2H_5)_2Br_2$;
trialkoxytitanium monohalides such as
$Ti(OCH_3)_3Cl$,
$Ti(OC_2H_5)_3Cl$,
$Ti(O\text{-}iC_3H_7)_3Cl$,
$Ti(O\text{-}nC_4H_9)_3Cl$, and
$Ti(OC_2H_5)_3Br$,
and tetraalkoxytitanium compounds such as
$Ti(OCH_3)_4$,
$Ti(OC_2H_5)_4$,
$Ti(O\text{-}nC_3H_7)_4$,
$Ti(O\text{-}iC_3H_7)_4$,
$Ti(O\text{-}nC_4H_9)_4$,
$Ti(OC_6H_{13})_4$, $Ti(OC_6H_{11})_4$,
$Ti(OC_8H_{17})_4$,
$Ti[OCH_2(C_2H_5)CHC_4H_9]_4$,
$Ti(OC_9H_{19})_4$,
$Ti[OC_6H_3(CH_3)_2]_4$,
$Ti(OC_{18}H_{35})_4$,
$Ti(OCH_3)_2(OC_4H_9)_2$,
$Ti(OC_3H_7)_3(OC_4H_9)$,
$Ti(OC_2H_5)_2(OC_4H_9)_2$,
$Ti(OC_2H_5)_2(O\text{-}iC_3H_7)_2$,
$Ti(OC_2H_5)(OC_{18}H_{35})_3$,
$Ti(OC_2H_5)_2(OC_{18}H_{35})_2$, and
$Ti(OC_2H_5)_3(OC_{18}H_{35})$.

Of these compound, the compounds where $1 \leq g \leq 4$ are preferable, and the compounds where $2 \leq g \leq 4$ are more preferable. Particularly preferred are tetraalkoxytitanium compounds.

The titanium catalyst component [A] in a liquid form which is a member for forming the olefin polymerization catalyst used in the process for preparing the ethylene/pentene-1 copolymers of the present invention is a substantially uniform solution which comprises the above-described halogen-containing magnesium compound, oleyl alcohol and the above-described titanium compound.

It is preferred that the titanium catalyst component in a liquid form is prepared, for example, by preparing a mixture of a halogen-containing magnesium compound and oleyl alcohol and then bringing the mixture into contact with a titanium compound. The mixture of a halogen-containing magnesium compound and oleyl alcohol may be in the form of a solution or a suspension, but a solution form is preferable. In another preferred embodiment, the titanium catalyst component is prepared by changing to a solution state while mixing the above-mentioned three ingredients.

In the preparation of the titanium catalyst component A] in a liquid form, the mixture of a halogen-containing magnesium compound and oleyl alcohol is preferably brought into contact with the titanium compound at a temperature of not lower than 40° C., preferably 40° to 200° C., more preferably 50° to 150° C. for at least one minute, preferably 15 minutes to 24 hours, particularly preferably 30 minutes to 15 hours to react them.

Further, the titanium catalyst component [A] in a liquid form can be prepared by bringing a halogen-containing magnesium compound, oleyl alcohol and a titanium compound simultaneously into contact with one another at a temperature of not lower than 40° C., preferably 40° to 200° C., more preferably 50° to 150° C. for at least one minute, preferably 15 minutes to 24 hours, particularly preferably 0 minutes to 15 hours to react them.

In the preparation of the titanium catalyst component in a liquid form, which comprises the halogen-containing magnesium compound, oleyl alcohol and the titanium compound, hydrocarbon solvents can be used.

Namely, the magnesium halide and oleyl alcohol are dissolved in a hydrocarbon solvent and may be brought into contact with the titanium compound. Alternatively, the halogen-containing magnesium compound, oleyl alcohol and the titanium compound are dissolved in a hydrocarbon solvent to thereby bring them into contact with one another.

Examples of such hydrocarbon solvents include aliphatic hydrocarbons such as pentane, hexane, heptane, octane, decane, dodecane, tetradecane and kerosine; alicyclic hydrocarbons such as cyclopentane, methylcyclopentane, cyclohexane, methylcyclohexane, cyclooctane and cyclohexene; aromatic hydrocarbons such as benzene, toluene, xylene, ethylbenzene, cumene and cymene; and halogenated hydrocarbons such as dichloroethane, dichlorobutane, trichloroethylene, carbon tetrachloride and chlorobenzene.

Preferably, the halogen-containing magnesium compound, the titanium compound and oleyl alcohol are used in the following amounts.

The ratio by mol of oleyl alcohol/MgCl$_2$ is generally at least 1, preferably 1 to 4.

The ratio by mol of the titanium compound/MgCl$_2$ is in the range of generally 0.04 to 0.30, preferably 0.05 to 0.20.

The halogen-containing organoaluminum compound [B] which is a member for forming the olefin polymerization catalyst used in the process for preparing the ethylene/pentene-1 copolymers of the present invention includes dialkylaluminum halides such as diethylaluminum chloride, dibutylaluminum chloride, diethylaluminum bromide;

alkylaluminum sesquihalides such as ethylaluminum sesquichloride, butylaluminum sesquichloride and ethylaluminum sesquibromide;

partially halogenated alkylaluminum compounds such as ethylaluminum dichloride, propylaluminum dichloride and butylaluminum dibromide; and partially alkoxylated and halogenated alkylaluminum compounds such as ethylaluminum ethoxychloride, butylaluminum butoxychloride and ethylaluminum ethoxybromide.

In addition to these halogen-containing organoaluminum compounds, organoaluminum compounds containing no halogen can be used.

Examples of the organoaluminum compounds containing no halogen which can be used in the present invention include trialkylaluminum compounds such as triethylaluminum and tributylaluminum;

trialkenylaluminum compounds such as isoprenylaluminum and triisoprenylaluminum;

dialkylaluminum alkoxides such as diethylaluminum ethoxide and dibutylaluminum butoxide;

alkylaluminum sesquialkoxides such as ethylaluminum sesquiethoxide and butylaluminum sesquibutoxide;

partially alkoxylated alkylaluminum compounds having an average composition represented by the formula $R^1{}_{2.5}Al(OR^2)_{0.5}$;

dialkylaluminum hydrides such as diethylaluminum hydride and dibutylaluminum hydride; and partially hydrogenated alkylaluminum compounds such as alkylaluminum dihydrides, for example, ethylaluminum dihydride and propylaluminum dihydride.

Further, organoaluminum compounds similar to the above-mentioned compounds include organoaluminum compounds in which two or more aluminum atoms are bonded to each other through oxygen atom or nitrogen atom. Concrete examples of such organoaluminum compounds include (C$_2$H$_5$)$_2$AlOAl(C$_2$H$_5$)$_2$, (C$_4$H$_9$)$_2$AlOAl(C$_4$H$_9$)$_2$, (C$_2$H$_5$)$_2$AlNAl(C$_2$H$_5$)$_2$,
|
C$_2$H$_5$ and methylaluminoxane.

Other examples of the organoaluminum compounds containing no halogen include complex compounds of aluminum with Group I metals of the Periodic Table. Concrete examples of such organoaluminum compounds include LiAl(C$_2$H$_5$)$_4$ and LiAl(C$_7$H$_{15}$)$_4$.

Among the above-described compounds, particularly preferred are trialkylaluminum compounds or alkylaluminum compounds in which two or more aluminum compounds are bonded to each other. These organoaluminum compounds containing no halogen can be used in an amount of not more than 70 mol %, preferably not more than 40 mol %, particularly preferably not more than 10 mol % in combination with the halogen-containing organoaluminum compounds.

The olefin polymerization catalysts comprising the above-mentioned components [A] and [B] can be used in the copolymerization of ethylene and pentene-1 as well as in the copolymerization of three or more ingredients of ethylene, pentene-1 and a minor portion of one or more other α-olefins or polyenes. Examples of other copolymerizable α-olefins in addition to ethylene and pentene-1 include 2-methylpropylene, 1-butene, 1-hexene, 4-methyl-1-pentene, 3-methyl-1-pentene, 1-octene, 1-nonene, 1-decene, 1-undecene and 1-dodecene. Examples of the polyenes include butadiene, isoprene, 1,4-hexadiene, dicyclopentadiene and 5-ethylidene-2-norbornene. The above-mentioned olefin polymerization catalysts are useful for use in the copolymerization of ethylene and pentene-1 in particular. In the copolymerization of ethylene and pentene-1, it is particularly preferred that the copolymerization is carried out by allowing at least about 75% by weight of ethylene to exist in the reaction system. When ethylene, pentene-1 and optionally a small amount of other α-olefin are copolymerized in the presence of the above-described olefin polymerization catalyst, there can be obtained low-density ethylene/pentene-1 copolymers having a narrow composition distribution, that is, a density of 0.87 to 0.94 g/cm$^3$, preferably 0.88 to 0.93 g/cm$^3$.

In the preparation of the ethylene/pentene-1 copolymers of the present invention, the copolymerization reaction of ethylene and pentene-1 is carried out in the presence of the aforesaid catalyst component in a hydrocarbon solvent. Examples of the hydrocarbon solvent include aliphatic hydrocarbons such as pentane, hexane, heptane, octane, decane, dodecane and kerosine and halogenated derivatives thereof; alicyclic hydrocarbons such as cyclohexane, methylcyclopentane and methylcyclohexane and halogenated derivatives thereof; and aromatic hydrocarbons such as benzene, toluene and xylene and halogenated derivatives thereof such as chlorobenzene. Olefin itself which is used in the copolymerization reaction as a copolymerizable monomer can be used as a solvent.

In carrying out the copolymerization reaction, titanium atom is used in an amount of preferably 0.0005 to about 1 mmol, more preferably about 0.001 to about 0.5 mmol per liter of the reaction volume and the organoaluminum compound is used in such an amount that to give a ratio by atom of aluminum/titanium of about 1 to about 2000, preferably about 5 to about 100. Olefin polymerization temperature is about 20° to about 300° C., preferably about 65° to about 250° C. Polymerization pressure is atmospheric pressure to 3000 kg/cm$^2$-G, preferably about 2 to about 100 kg/cm$^2$-G, particularly preferably about 5 to about 50 kg/cm$^2$-G.

It is preferable that hydrogen is allowed to coexist in the olefin polymerization system to control molecular weight.

The polymerization may be carried out continuously or batchwise. Alternatively, the polymerization may be carried out by two or more steps under different conditions.

When ethylene and pentene-1 are copolymerized under the above-described conditions, at least 80% by weight, preferably at least 90% by weight of the copolymer which is being formed is dissolved in a reaction solvent or molten state. The ethylene/pentene-1 copolymers obtained by carrying out the copolymerization under such conditions as mentioned above are suitable for use in various applications, because the copolymers have various characteristics described hereinafter. The ethylene/pentene-1 copolymers obtained by the process of the present invention comprise 1 to 25% by weight, preferably 4 to 20% by weight, particularly preferably 6 to 15% by weight of a constitution unit derived from pentene-1 and 75 to 99% by weight, preferably 80 to 96% by weight, particularly preferably 85 to 94% by weight of a constitution unit derived from ethylene.

The ethylene/pentene-1 copolymers may optionally contain not more than 10% by weight, preferably not more than 5% by weight, particularly preferably not more than 3% by weight of a constitution unit derived from other α-olefin or polyene in addition to the constitution units derived from ethylene and pentene-1 as described above.

The ethylene/pentene-1 copolymers have a melt flow rate (MFR) of 0.01 to 100 g/10 min, preferably 0.05 to 50 g/10 min as measured according to ASTM D 1238E.

The ethylene/pentene-1 copolymers obtained by the process of the present invention have a density of 0.87 to 0.94 g/cm$^3$, preferably 0.88 to 0.93 g/cm$^3$ as measured according to ASTM D 1505.

The ratio (RS) of the impact strength of a cast film of 40 μm in thickness to the tear strength thereof in the take-off direction fulfills the relationship represented by the above-described formula [2], preferably the formula [2'], particularly preferably the formula [2"], said cast film being obtained by casting the ethylene/pentene-1 copolymer having the aforesaid characteristics.

It is also desirable that other physical properties such as the DSC characteristics of the ultra-slowly cooled samples, the impact strength of cast films, the relationship between the tear strength ($T_{MD}$) and the melt flow rate (MFR), the stress cracking resistance (ESCR) and the relationship between the haze and the melt flow rate (MFR) of the ethylene/propene-1 copolymers obtained by the process of the present invention meet the requirements represented by the above-described formulas.

The above-mentioned ethylene/pentene-1 copolymers are excellent in transparency, impact resistance, tear resistance, blocking resistance, low-temperature heat sealing properties, heat resistance and stress crack resistance and these excellent properties are well-balanced so that the copolymers are suitable for use in the preparation of packaging films in particular. In addition to being used as packaging film materials, the copolymers can be processed into various molded articles such as containers, articles for daily use, pipes and tubes by T-die molding, inflation molding, blow molding, injection molding and extrusion. Further, the copolymers can be extrusion-coated on other film or co-extruded together with other film to prepare various composite films. Furthermore, the copolymers can be used in the fields of steel pipe coating materials, wire coating materials and expansion-molded articles. In addition, the copolymers can be used as blends with other thermoplastic resins such as polyolefins, for example, high-density polyethylene, medium-density polyethylene, polypropylene, poly(1-butene), poly(4-methyl-1-pentene), low-crystalline to non-crystalline copolymers of ethylene and propylene or 1-butene and propylene-1-butene copolymers.

If desired, heat stabilizers, weathering stabilizers, antistatic agents, anti-blocking agents, slip agents, nucleating agents, pigments, dyes and inorganic or organic fillers may be blended with the above-mentioned ethylene/pentene-1 copolymers.

The ethylene/pentene-1 copolymer compositions of the present invention are illustrated below.

The ethylene/pentene-1 copolymer compositions of the present invention comprise an ethylene/pentene-1 copolymer and at least the compound selected from the group consisting of the following compounds (a) to (e).

(a) Phenolic stabilizer
(b) Organic phosphite stabilizer
(c) Thioether stabilizer
(d) Hindered amine stabilizer
(e) Metal salt of higher aliphatic acid.

The ethylene/pentene-1 copolymers used in the compositions of the present invention have a melt flow rate (MFR) of 0.01 to 100 g/10 min, preferably 0.05 to 50 g/10 min as measured according to ASTM D 1238E. The ethylene/pentene-1 copolymers have a density of 0.87 to 0.94 g/cm$^3$, preferably 0.88 to 0.93 g/cm$^3$ as measured according to ASTM D 1505.

The ethylene/pentene-1 copolymers comprise 1 to 25% by weight, preferably 4 to 23% by weight, particularly preferably 6 to 20% by weight of a constitution unit derived from pentene-1 and 75 to 99% by weight, preferably 77 to 96% by weight, particularly 80 to 94% by weight of a constitution unit derived from ethylene.

The ethylene/pentene-1 copolymers may optionally contain not more than 10% by weight, preferably not more than 5% by weight, particularly preferably not more than 3% by weight of a constitution unit derived from one or more α-olefins or polyenes in addition to the constitution units derived from ethylene and pentene-1.

The ratio (RS) of the impact strength of a cast film of 40 μm in thickness to the tear strength thereof in the take-off direction satisfies the relationship represented by the above-described formula [2], preferably the formula [2'], particularly preferably the formula [2''], said cast film being obtained by casting the ethylene/pentene-1 copolymer.

Further, the DSC characteristics of the ultra-slowly cooled samples of the ethylene/pentene-1 copolymers used in the compositions of the present invention satisfy the relationship represented by the above-described formula [1], preferably the formula [1'], particularly preferably the formula [1''].

It is also desirable that other physical properties of the ethylene/pentene-1 copolymers used for the present compositions, such as the impact strength of the cast film, the relationship between the tear strength (T$_{MD}$) and melt flow rate, the stress Cracking resistance (ESCR) and the relationship between the haze and the melt flow rate (MFR) meet the above-described requirements of the ethylene/pentene-1 copolymer of the present invention.

The ethylene/pentene-1 copolymer used in the compositions according to the present invention are preferably manufactured by the above-described process according to the present invention for preparing the ethylene/pentene-1 copolymer.

The compositions according to the present invention comprise the above-mentioned ethylene/pentene-1 copolymer and at least one compound selected from the group consisting of the compounds denoted by (a) to (e) mentioned above.

These compounds are illustrated hereinafter.

Phenolic Stabilizers (a)

Though conventionally known phenolic compounds are used as phenolic stabilizers without specific restriction, concrete examples of the phenolic stabilizers include
2,6-di-tert-butyl-4-methylphenol,
2,6-di-tert-butyl-4-ethylphenol,
2,6-dicyclohexyl-4-methylphenol,
2,6-diisopropyl-4-ethylphenol,
2,6-di-tert-amyl-4-methylphenol,
2,6-di-tert-octyl-4-n-propylphenol,
2,6-dicyclohexyl-4-n-octylphenol,
2-isopropyl-4-methyl-6-tert-butylphenol,
2-tert-butyl-2-ethyl-6-tert-octylphenol,
2-isobutyl-4-ethyl-6-tert-hexylphenol,
2-cyclohexyl-4-n-butyl-6-isopropylphenol,
dl-α-tocopherol,
tert-butylhydroquinone,
2,2'-methylenebis(4-methyl-6-tert-butylphenol),
4,4'-butylidenebis(3-methyl-6-tert-butylphenol),
4,4'-thiobis(3-methyl-6-tert-butylphenol),
2,2'-thiobis(4-methyl-6-tert-butylphenol),
4,4'-methylenebis(2,6-di-tert-butylphenol),
2,2'-methylenebis[6-(1-methylcyclohexyl)-p-cresol],
2,2'-ethylidenebis(2,4-di-tert-butylphenol),
2,2'-butylidenebis(2-tert-butyl-4-methylphenol),
1,1,3-tris(2-methyl-4-hydroxy-5-tert-butylphenyl)butane,
triethylene glycol bis[3-(3-tert-butyl-5-methyl-4-hydroxyphenyl)propionate],
1,6-hexanediol bis[3-(3,5-di-tert-butyl-4-hydroxyphenyl)propionate],
2,2'-thiodiethylenebis[3-(3,5-di-tert-butyl-4-hydroxyphenyl)propionate],
N,N'-hexamethylenebis(3,5-di-tert-butyl-4-hydroxyhydrocinnamamide),
3,5-di-tert-butyl-4-hydroxybenzyl phosphonate diethyl ester,
1,3,5-tris(2,6-dimethyl-3-hydroxy-4-tert-butylbenzyl) isocyanurate,
1,3,5-tris[(3,5-di-tert-butyl-4-hydroxyphenyl)propionyloxyethyl] isocyanurate,
tris(4-tert-butyl-2,6-dimethyl-3-hydroxybenzyl)isocyanurate,
2,4-bis(n-octylthio)-6-(4-hydroxy-3,5-di-tert-butylanilino)-1,3,5-triazine,
tetrakis[methylene 3-(3,5-di-tert-butyl-4-hydroxyphenyl)propionate]methane,
bis(3,5-di-tert-butyl-4-hydroxybenzylphosphonic acid ethyl ester) calcium,
bis(3,5-di-tert-butyl-4-hydroxybenzylphosphonic acid ethyl ester) nickel,
bis[3,3-bis(3-tert-4-hydroxyphenyl)butyric acid]glycol ester,
N,N'-bis[(3,5-di-tert-butyl-4-hydroxyphenyl)-propionyl]hydrazine,
2,2'-oxamidobis[ethyl-3-(3,5-di-tert-butyl-4-hydroxyphenyl)propionate],
2,2'-methylenebis(4-methyl-6-tert-butylphenol) terephthalate,
1,3,5-trimethyl-2,4,6-tris(3,5-di-tert-butyl-4-hydroxybenzyl)benzene,
3,9-bis[1,1-dimethyl-2-{β-(3-tert-butyl-4-hydroxy-5-methylphenyl)propionyloxy}ethyl]-2,4,8,10-tetraoxaspiro[5,5]-undecane,
2,2-bis[4-(2-(3,5-di-tert-butyl-4-hydroxyhydrocinnamoyloxy))ethoxyphenyl]propane, and alkyl esters of β-(3,5-di-tert-butyl-4-hydroxyphenyl)-propionic acid.

Of these compounds, preferred are
triethylene glycol bis[3-(3-tert-butyl-5-methyl-4-hydroxyphenyl)propionate],
1,6-hexanediol bis[3-(3,5-di-tert-butyl-4-hydroxyphenyl)propionate],
2,2-thiodiethylenebis[3-(3,5-di-tert-butyl-4-hydroxyphenyl)propionate],
N,N'-hexamethylenebis(3,5-di-tert-butyl-4-hydroxyhydrocinnamamide),
3,5-di-tert-butyl-4-hydroxybenzyl phosphonate diethyl ester,
1,3,5-tris(2,6-dimethyl-3-hydroxy-4-tert-butylbenzyl) isocyanurate,
1,3,5-tris[(3,5-di-tert-butyl-4-hydroxyphenyl)propionyloxyethyl] isocyanurate,
tris(4-tert-butyl-2,6-dimethyl-3-hydroxybenzyl) isocyanurate,
2,4-bis(n-octylthio)-6-(4-hydroxy-3,5-di-tert-butylanilino)-1,3,5-triazine,
tetrakis[methylene 3-(3,5-di-tert-butyl-4-hydroxyphenyl)propionate]methane,
bis(3,5-di-tert-butyl-4-hydroxybenzylphosphonic acid ethyl ester) calcium,
bis(3,5-di-tert-butyl-4-hydroxybenzylphosphonic acid ethyl ester) nickel,
bis[3,3-bis(3-tert-4-hydroxyphenyl)butyric acid]glycol ester,
N,N'-bis[(3,5-di-tert-butyl-4-hydroxyphenyl)propionyl]hydrazine,
2,2'-oxamidobis[ethyl-3-(3,5-di-tert-butyl-4-hydroxyphenyl)propionate],
2,2'-methylenebis(4-methyl-6-tert-butylphenol) terephthalate,
1,3,5-trimethyl-2,4,6-tris(3,5-di-tert-butyl-4-hydroxybenzyl)benzene,
3,9-bis[1,1-dimethyl-2-{β-(3-tert-butyl-4-hydroxy-5-methylphenyl)propionyloxy}ethyl]-2,4,8,10-tetraoxaspiro[5,5]-undecane,
2,2-bis[4-(2-(3,5-di-tert-butyl-4-hydroxyhydrocinnamoyloxy))ethoxyphenyl]propane, and
alkyl esters of β-(3,5-di-tert-butyl-4-hydroxyphenylpropionic acid.

Of the alkyl esters of β-(3,5-di-tert-butyl-4-hydroxyphenyl)propionic acid mentioned above, particularly preferred are alkyl esters having alkyl group of not greater than 18 carbon atoms.

Furthermore, the following compounds are particularly preferably used in the present invention:
tetrakis[methylene 3-(3,5-di-tert-butyl-4-hydroxyphenyl)propionate]methane,
bis(3,5-di-tert-butyl-4-hydroxybenzylphosphonic acid ethyl ester) calcium,
bis(3,5-di-tert-butyl-4-hydroxybenzylphosphonic acid ethyl ester) nickel,
bis[3,3-bis(4-hydroxy-3-tert-butylphenyl)butyric acid]glycol ester,
N,N'-bis[(3,5-di-tert-butyl-4-hydroxyphenyl)propionyl]hydrazine,
2,2'-oxamidobis[ethyl-3-(3,5-di-tert-butyl-4-hydroxyphenyl)propionate],
2,2'-methylenebis(4-methyl-6-tert-butylphenol) terephthalate,
1,3,5-trimethyl-2,4,6-tris(3,5-di-tert-butyl-4-hydroxybenzyl)benzene,
3,9-bis[1,1-dimethyl-2-{β-(3-tert-butyl-4-hydroxy-5-methylphenyl)propionyloxy}ethyl]-2,4,8,10-tetraoxaspiro[5,5]-undecane,
1,3,5-tris[(3,5-di-tert-butyl-4-hydroxyphenyl)propionyloxyethyl]isocyanurate, and
2,2-bis[4-(2-(3,5-di-tert-butyl-4-hydroxyhydrocinnamoyloxy))ethoxyphenyl]propane.

These phenolic stabilizers are used singly or in combination.

Organic Phosphite Stabilizers (b)

Though conventionally known organic phosphite stabilizers are used without specific restriction in the present invention, concrete examples of the organic phosphite stabilizers include
trioctyl phosphite, trilauryl phosphite, tridecyl phosphite, octyl diphenyl phosphite, tris(2,4-di-tert-butylphenyl) phosphite, triphenyl phosphite, tris(butoxyethyl) phosphite, tris(nonylphenyl) phosphite, distearylpentaerithrytol diphosphite, tetra(tridecyl)-1,1,3-tris(2-methyl-5-tert-butyl-4-hydroxyphenyl)butane diphosphite, tetra($Cl_2$-$Cl_5$ mixed alkyl)-4,4'-isopropylidenediphenyl diphosphite, tetra(tridecyl)-4,4'-butylidenebis( 3-methyl-6-tert-butylphenol) diphosphite, tris(3,5-di-tert-butyl-4-hydroxyphenyl) phosphite, tris(mixed monononylphenyl, dinonylphenyl) phosphite, hydrogenated-4,4'-isopropylidenediphenol polyphosphite, bis(octylphenyl) bis[4,4'-butylidenebis(3-methyl-6-tertbutylphenol)] 1,6-hexanediol diphosphite, phenyl 4,4'-isopropylidenediphenol pentaerythritol diphosphite, tris[4,4'-isopropylidenebis(2-tert-butylphenol)] phosphite, phenyl diisodecyl phosphite, di(nonylphenyl) pentaerythritol diphosphite, tris(1,3-distearoyloxyisopropyl) phosphite, 4,4'-isopropylidenebis(2-tert-butylphenol) di(nonylphenyl) phosphite, and 9,10-dihydro-9-oxa-9-oxa-10-phosphaphenanthrene-10-oxide.

In addition, bis(dialkylphenyl) pentaerythritiol diphosphite esters having the formula (1) of spiro type or the formula (2) of cage type illustrated below are also used:

Usually, a mixture of both isomers is most often used due to utilization of an economically advantageous process for manufacturing such phosphite ester.

wherein $R^1$, $R^2$ and $R^3$ are each a hydrogen an alkyl group having 1 to 9 carbon atoms, preferably a branched alkyl group, particularly preferably a tert-butyl group, the most preferable substitution positions of $R^1$, $R^2$ and $R^3$ on the phenyl groups being 2-, 4- and 6-positions. Preferable phosphite esters include bis(2,4-di-tert-butylphenyl)pentaerythritol diphosphite and bis(2,6-di-tert-butyl-4-methylphenyl)pentaerythritol diphosphite, and there may also be mentioned phosphonites having a structure wherein a carbon atom is directly bonded to a phosphorus atom, such as tetrakis(2,4-di-tert-butylphenyl)-4,4'-biphenylene diphosphonite.

These organic phosphite stabilizers are used singly or in combination.

Thioether Stabilizers (c)

Though conventionally known thioether stabilizers are used without specific restriction in the present invention, concrete examples of the thioether stabilizers include dialkyl esters such as dilauryl, dimyristyl and distearyl ester of thiodipropionic acid, esters of alkylthiopropionic acid such as butyl-, octyl-, lauryl- and stearylthiopropionic acid with a polyhydric alcohol (for example, glycerine, trimethylolethane, trimethylolpropane, pentaerythritol and trishydroxyethyliscyanurate), such as pentaerythritoltetralaurylthiopropionate. More concretely, the thioether stabilizers include dilauryl thiodipropionate, dimyristyl thiodipropionate, lauryl stearyl thiodipropionate and distearyl thiodibutyrate.

These thioether stabilizers are used singly or in combination.

Hindered Amine Stabilizers (d)

There are used without specific restriction as the hindered amine stabilizers conventionally known compounds having a structure wherein methyl groups are substituted for all the hydrogen atoms bonded to the carbon atoms at the 2- and 6-positions of piperidine. Concrete examples of the hindered amine stabilizers include (1) bis(2,2,6,6-tetramethyl-4-piperidyl) sebacate,
(2) dimethyl succinate-1-(2-hydroxyethyl)-4-hydroxy-2,2,6,6-tetramethylpiperidine polycondensate,
(3) poly[[6-(1,1,3,3-tetramethylbutyl)imino-1,3,5-triazine-2,4-diyl][(2,2,6,6-tetramethyl-4-piperidyl)imino]hexamethylene[(2,2,6,6-tetramethyl-4-piperidyl)imino]],
(4) tetrakis(2,2,6,6-tetramethyl-4-piperidyl) 1,2,3,4-butanetetracarboxylate,
(5) 2,2,6,6-tetramethyl-4-piperidyl benzoate
(6) bis(1,2,6,6-pentamethyl-4-piperidyl)-2-(3,5-di-tert-butyl-4-hydroxybenzyl)-2-n-butyl malonate,
(7) bis-(N-methyl-2,2,6,6-tetramethyl-4-piperidyl) sebacate,
(8) 1,1'-(1,2-ethanediyl)bis(3,3,5,5-tetramethylpiperazinone),
(9) (mixed 2,2,6,6-tetramethyl-4-piperidyl/tridecyl) 1,2,3,4-butanetetracarboxylate,
(10) (mixed 1,2,2,6,6-pentamethyl-4-piperidyl/tridecyl) 1,2,3,4-butanetetracarboxylate,
(11) mixed (2,2,6,6-tetramethyl-4-piperidyl/$\beta,\beta,\beta',\beta'$-tetramethyl-3,9-[2,4,8,10-tetraoxasprio(5,5)-undecane]diethyl} 1,2,3,4-butanetetracarboxylate,
(12) mixed (1,2,2,6,6-pentamethyl-4-piperidyl/$\beta,\beta,\beta',\beta'$-tetramethyl-3,9-[2,4,8,10-tetraoxaspiro(5,5)-undecane]diethyl} 1,2,3,4-butanetetracarboxylate,
(13) N,N'-bis(3-aminopropyl)ethylenediamine-2,4-bis[N-butyl-N-(1,2,2,6,6-pentamethyl-4-piperidyl)amino]-6-chloro-1,3,5-triazine condensate,
(14) poly[[6-N-morpholinyl-1,3,5-triazine-2,4-diyl]-[(2,2,6,6-tetramethyl-4-piperidyl)imino]hexamethylene[(2,2,6,6-tetramethyl-4-piperidyl)imino]],
(15) condensate of N,N'-bis(2,2,6,6-tetramethyl-4-piperidyl)hexamethylenediamine with 1,2-dibromoethane, and
(16) [N-(2,2,6,6-tetramethyl-4-piperidyl)-2-methyl-2-(2,2,6,6-tetramethyl-4-piperidyl)imino]propionamide.

Of the hindered amine stabilizers, those especially preferably employed are the compounds denoted by (1), (2), (3), (4), (8), (10), (11), (14) and (15).

These hindered amine stabilizers are used singly or in combination.

Metal Salts of Higher Aliphatic Acid (e)

Examples of metal salts of the higher aliphatic acid which may be used in the invention include alkaline earth metal salts such as magnesium salts, calcium salts and barium salts, alkali metal salts such as sodium salts, potassium salts and lithium salts, cadmium salts, zinc salts and lead salts of higher aliphatic acids such as stearic acid, oleic acid, lauric acid, capric acid, ariachidic acid, palmitic acid, behenic acid, 12-hydroxystearic acid, ricinolic acid, and montanic acid. Concrete examples of the higher aliphatic acid metal salts include magnesium stearate, magnesium laurate, magnesium palmitate, calcium stearate, calcium oleate, calcium laurate, barium stearate, barium oleate, barium laurate, barium arachidate, barium behenate, zinc stearate, zinc oleate, zinc laurate, lithium stearate, sodium stearate, sodium palmitate, sodium laurate, potassium stearate, potassium laurate, calcium 12-hydroxystearate and calcium montanate and zinc montanate.

These higher aliphatic acid metal salts are used singly or in combination.

Higher aliphatic acid metal salts as described above act as a lubricant and a rust-preventive agent. Ethylene/pentene-1 copolymer compositions containing such higher aliphatic acid metal salts therefore are excellent in moldability and effective in rust prevention of molding machines, etc.

Furthermore, when a higher aliphatic acid metal salt as described above in an amount as described below is added to an ethylene/pentene-1 copolymer or an ethylene/pentene-1 copolymer composition, the metal salt is capable of sufficiently absorbing residual chlorine originating from the catalyst for the above-mentioned copolymer. Accordingly, resin obtained from the copolymer or the copolymer composition does not show deterioration of its characteristics.

Preferable examples of the compositions according to the present invention include (1) a composition comprising
an ethylene/pentene-1 copolymer in an amount of 100 parts by weight, and
a phenolic stabilizer (a) in an amount of 0.005 to 5 parts by weight, preferably 0.005 to 2 parts by weight, more preferably 0.01 to 1 part by weight;

(2) a composition comprising
an ethylene/pentene-1 copolymer in an amount of 100 parts by weight,
a phenolic stabilizer
 (a) in an amount of 0.005 to 5 parts by weight, preferably 0.005 to 2 parts by weight, more preferably 0.01 to 1 part by weight, and at least one compound selected from the group consisting of
 (b) organic phosphite stabilizers,
 (c) thioether stabilizers,
 (d) hindered amine stabilizers and
 (e) higher aliphatic acid metal salts
in an amount of 0.005 to 5 parts by weight, preferably 0.005 to 2 parts by weight, more preferably 0.01 to 1 part by weight;

(3) a composition comprising an ethylene/pentene-1 copolymer in an amount of 100 parts by weight, and an organic phosphite stabilizer (b) in an amount of 0.005 to 5 parts by weight, preferably 0.005 to 2 parts by weight, more preferably 0.01 to 1 part by weight;

(4) a composition comprising
an ethylene/pentene-1 copolymer in an amount of 100 parts by weight, an organic phosphite stabilizer (b) in an amount of 0.005 to 5 parts by weight, preferably 0.005 to 2 parts by weight, more preferably 0.01 to 1 part by weight, and at least one compound selected from the group consisting of
(c) thioether stabilizers,
(d) hindered amine stabilizers and '(e) higher aliphatic acid metal salts
in an amount of 0.005 to 5 parts by weight, preferably 0.005 to 2 parts by weight, more preferably 0.01 to 1 part by weight;

(5) a composition comprising
an ethylene/pentene-1 copolymer in an amount of 100 parts by weight, and
a thioether stabilizer (c) in an amount of 0.005 to 5 parts by weight, preferably 0.005 to 2 parts by weight, more preferably 0.01 to 1 part by weight;

(6) a composition comprising
an ethylene/pentene-1 copolymer in an amount of 100 parts by weight,
a thioether stabilizer (c) in an amount of 0.005 to 5 parts by weight, preferably 0.005 to 2 parts by weight, more preferably 0.01 to 1 part by weight, and at least one compound selected from the group consisting of
(d) hindered amine stabilizers and
(e) higher aliphatic acid metal salts
in an amount of 0.005 to 5 parts by weight, preferably 0.005 to 2 parts by weight, more preferably 0.01 to 1 part by weight;

(7) a composition comprising
an ethylene/pentene-1 copolymer in an amount of 100 parts by weight, and
a hindered amine stabilizer (d) in an amount of 0.005 to 5 parts by weight, preferably 0.005 to 2 parts by weight, more preferably 0.01 to 1 part by weight;

(8) a composition comprising
an ethylene/pentene-1 copolymer in an amount of 100 parts by weight,
a hindered amine stabilizer (d) in an amount of 0.005 to 5 parts by weight, preferably 0.005 to 2 parts by weight, more preferably 0.01 to 1 part by weight, and
a higher aliphatic acid metal salt (e) in an amount of 0.005 to 5 parts by weight, preferably 0.005 to 2 parts by weight, more preferably 0.01 to 1 part by weight; and (9) a composition comprising
an ethylene/pentene-1 copolymer in an amount of 100 parts by weight, and
a higher aliphatic acid metal salt (e) in an amount of 0.005 to 5 parts by weight, preferably 0.005 to 2 parts by weight, more preferably 0.01 to 1 part by weight.

5 When these stabilizers are added in the amount range as described above to 100 parts by weight of the ethylene/pentene-1 copolymer, the resultant compositions of the invention show highly improved thermal resistance at low cost of the stabilizers without deteriorating the resin properties such as tensile strength.

The ethylene/pentene-1 copolymer compositions according to the present invention may be incorporated with such compounding agents usually added to and mixed with polyolefins as diluents, heat-resistant stabilizers, weather-resistant stabilizers, pigments, dyes, lubricants and antistatic agents in addition to the above-described components so long as the incorporation does not impair the object of the invention.

EFFECT OF THE INVENTION

The ethylene/pentene-1 copolymer of the present invention fulfills aforementioned specific requisites, so that when the copolymer is molded into a film, the obtained film has a good balance between impact resistance and tear properties. Further, the film formed from the copolymer is excellent in the transparency, and the transparency of the film is hardly varied even after the film is subjected to a heat treatment. Furthermore, the film is also excellent in the blocking resistance. In addition to those advantages, the film shows high SC resistance and has haze development of extremely low level. Accordingly, the ethylene/pentene-copolymer of the invention can be favorably applied to various uses.

In the process for the preparation of an ethylene/pentene-1 copolymer according to the invention, the polymerization reaction is performed under the aforementioned specific conditions. Therefore, when a copolymer prepared by the process is molded into a film, the obtained film has a good balance between impact resistance and tear properties. Further, the film is excellent in the transparency, and the transparency of the film is hardly varied even after the film is subjected to a heat treatment. Furthermore, the film is also excellent in the blocking resistance. In addition to those advantages, the film shows high SC resistance and has haze development of extremely low level. Accordingly, the ethylene/pentene-1 copolymer prepared by the process of the invention can be favorably applied to various uses.

The ethylene/pentene-1 copolymer composition of the invention is excellent in heat stability in the molding stage, long-term heat stability and weatherability. Further, the ethylene/pentene-1 copolymer composition hardly suffers heat deterioration when the composition is formed into a molded product such as a film, so that the composition of the invention can be employed for forming a molded product having high impact strength and good tear properties.

EXAMPLE

The present invention further described by the following example, but the examples are by no means given to restrict the invention.

Physical properties of the films are measured by the following methods.

(1) Haze: A haze is measured in accordance with ASTM D 1003.
(2) Gloss: A gloss is measured in accordance with ASTM D 523.
(3) Blocking resistance: A blocking resistance is measured in accordance with ASTM D 1893, and the measurement is carried out on a film having been allowed to stand still for 7 days under a load of 10 kg in an oven at 50° C.
(4) Tear strength: A tear strength is measured in accordance with JIS Z 1702.

(5) Impact strength: An impact strength is measured in accordance with JIS P 8134.

(6) Heat seal: Heat seal is carried out using a heat sealer (manufactured by Toyo Seiki K.K.) by sealing 5 samples (n =5) at a respective upper seal bar temperature of 100°, 105°, 110°, 115°, 120°, 125° and 130° C. Peel test of the resultant seal samples is conducted using an Instron type universal tester with a distance between chucks of 30 mm and at a cross head speed of mm/min. The minimum complete heat seal temperature is defined as the minimum temperature at which not more than 3 samples (n=3) out of 5 samples (n=5) are broken not through elongation peel but through breaking at a heat seal portion or an original film portion. Heat seal conditions are described below in detail.

i. Heat seal pressure: 2 kg/cm$^2$
ii. Seal time: 1 sec,
iii Upper seal bar temperature: 100°, 105°, 110°, 115°, 120°, 125° and 130° C.,
iv. Lower seal bar temperature: 70° C.,
v. Test sample: 120×15 mm, and
vi. Seal width: 10 mm.

The types of the stabilizers used in Examples described hereinafter and methods for evaluating the stability of the stabilizers are described below.

Types of Stabilizers Used

Phenolic Stabilizers

A: Stearyl ester of β-(3,5-di-tert-butyl-4-hydroxyphenyl)propionic acid (trade name: Irganox 1076, from Nippon Ciba Geigy, Co.)

B: Tetrakis[methylene 3-(3,5-di-tert-butyl-4-hydroxyphenyl)propionate]methane (trade name: Irganox 1010, from Nippon Ciba Geigy, Co.)

Organic Phosphite Stabilizers

C: Tris(2,4-di-tert-butylphenyl) phosphite (trade name: Phosphite 168, from Nippon Ciba Geigy, Co.)

D: Tetrakis(2,4-di-tert-butylphenyl)-4,4'-biphenylene diphosphite (trade name: Sandstab P-EPQ, from Sandoz, Co.)

Thioether Stabilizers

E: Dilauryl thiodipropionate (trade name: Antiox L, from Nippon Yushi, Co.)

F: Distearyl thiodipropionate (trade name: DSTP "Yoshitomi", from Yoshitomi Pharmaceutical Co.)

G: Pentaerythritol tetra-β-mercaptolaurylthioprionate (trade name: Seanox 412S, from Shipro Chemical, Co.)

Hindered Amine Stabilizers

H: Bis(2,2,6,6-tetramethyl-4-piperidyl) sebacate (trade name: Sanol LS770, from Sankyo, Co.)

I: Poly[6-(1,1,3,3-tetramethylbutyl)imino-1,3,5-triazine-2,4-diyl][(2,2,6,6-tetramethyl-4-peperidyl)imino]-hexamethylene-[(2,2,6,6-tetramethyl-4-piperidyl)imino] (trade name: Chimassorb 944LD, from Nippon Ciba Geigy, Co.)

Metal Salts of Aliphatic Acids

J: Calcium stearate
K: Calcium 12-hydroxystearate
L: Magnesium stearate
M: Calcium montanate

Measurement Method

MFR: An MFR is measured in accordance with ASIM D 1238 under 2.16 kg load at 190° C.

Impact Strength: An impact strength is measured in accordance with JlS P8134.

Evaluation of Stability i) Thermal stability in the molding stage MFR of a film The film has better heat stability when it shows a less difference between the MFR of the film and that of the pellets. Physical properties of a film (impact strength) The film shows less deterioration during molding when it has a larger impact strength.

ii) Long-term heat stability

A film is aged at 100° C. in a gear oven, and a period of time from the start of aging to the time when the tensile elongation becomes ½ of that of the initial value is measured.

The film has better heat-resistant and aging-resistant properties when it shows a longer period of time.

iii) Weatherability

A film is irradiated with light for 500 hours by using a sunshine weatherometer at a discharge voltage of 50 V and a discharge current of 60 A, and with rain, and a retention of tensile elongation thereof is measured.

The film has better weatherability when it shows a larger retention of tensile elongation.

EXAMPLE 1

Preparation of a Titanium Catalyst Component (A)

Commercially available anhydrous magnesium chloride in an amount of 476 g was suspended in 10 liter of n-decane in a nitrogen atmosphere, and 4.0 kg of oleyl alcohol was added to the suspension. Reaction was carried out with stirring at 135° C. for 5 hours to obtain a colorless transparent solution.

The solution temperature was lowered to 110° C., and 0.45 mole of Ti(OC$_2$H$_5$)$_4$ was added to the solution. Reaction was conducted at 110° C. for 5 hours. The resultant solution was stored at room temperature.

Polymerization

Dehydrated and purified hexane, ethylaluminum sesquichloride and the catalyst obtained above were continuously fed to a continuous polymerization reaction vessel having an inner capacity of 200 liter at a rate of liter/hour, 19.9 mmole/liter and 0.50 mmole/hour in terms of titanium atom, respectively, and simultaneously ethylene, 1-pentene and hydrogen were also continuously fed to the vessel at a rate of 13 kg/hour, 5.4 kg/hour and 9.0 liter/hour, respectively. The copolymerization was conducted at a polymerization temperature of 170° C., a total pressure of 31 kg/cm$^2$-G and a copolymer concentration to hexane of 105 g/liter and for a residence time of 1 hour. The catalyst activity corresponded to 19,200 g-copolymer/mmole-Ti. The polymerization conditions are shown in Table 1.

Pelletization

Irganox 1076 (trade name, from Ciba Geigy, Co.) in an amount of 0.20 part by weight, 0.10 part by weight of calcium stearate and 0.10 part by weight of silica were added to 100 parts by weight of the resultant copolymer, and the mixture was pelletized.

Preparation of Films and Evaluation Method thereof

Films each 420 mm wide and 0.04 mm thick were formed out of the pellets using a commercially available T-die film molding machine equipped with an extruder 65 mm in diameter. The forming was carried out under the following conditions: a resin temperature of 235° C. during molding, a screw speed of the extruder of 40 rpm, a chill roll temperature of 35° C., a film forming rate of 20 m/min and a draft ratio of 0.057.

The physical properties of films formed from thus obtained copolymer are shown in Table 2. Further the resistance to heat aging was 200 days, and the weathering resistance was 30%.

EXAMPLE 2 and COMPARATIVE EXAMPLES 1 to 4

The procedure of Example 1 was repeated except that part of the polymerization conditions were altered as shown in Table 1 to effect polymerization. The polymerization conditions and physical properties of the resultant films are shown in Table 1 and Table 2, respectively.

TABLE 1

|  | Ti (mmole/hr) | Co-catalyst Type | Co-catalyst Amt. (mmole/hr) | α-Olefin Type | α-Olefin Amt. (kg/hr) | $H_2$ (l/hr) | MFR (g/10 min) | D (g/cm$^3$) | Catalyst Activity (g copolymer/mmole-Ti) |
|---|---|---|---|---|---|---|---|---|---|
| Ex. 1 | 0.50 | Et$_{1.5}$AlCl$_{1.5}$ | 19.9 | 1-pentene | 5.4 | 9.0 | 2.2 | 0.921 | 19200 |
| Ex. 2 | 0.60 | Et$_{1.5}$AlCl$_{1.5}$ | 24.0 | 1-pentene | 10.0 | 3.9 | 2.4 | 0.905 | 16000 |
| Comp. Ex. 1 | 0.54 | Et$_{1.5}$AlCl$_{1.5}$ | 21.5 | 1-butene | 3.4 | 7.3 | 2.0 | 0.921 | 20100 |
| Comp. Ex. 2 | 0.64 | Et$_{1.5}$AlCl$_{1.5}$ | 25.6 | 1-butene | 6.6 | 4.6 | 2.1 | 0.904 | 16800 |
| Comp. Ex. 3 | 0.43 | Et$_{1.5}$AlCl$_{1.5}$ | 17.2 | 1-hexene | 6.7 | 11.3 | 2.0 | 0.920 | 23800 |
| Comp. Ex. 4 | 0.51 | Et$_{1.5}$AlCl$_{1.5}$ | 20.5 | 1-hexene | 14.1 | 7.1 | 2.3 | 0.905 | 19900 |

TABLE 2

|  | Ex. 1 | Ex. 2 | Comp. Ex. 1 | Comp. Ex. 2 | Comp. Ex. 3 | Comp. Ex. 4 |
|---|---|---|---|---|---|---|
| MFR | 2.2 | 2.4 | 2.0 | 2.1 | 2.2 | 2.3 |
| Density | 0.921 | 0.905 | 0.921 | 0.904 | 0.920 | 0.905 |
| Comonomer | 1-pentene | 1-pentene | 1-butene | 1-butene | 1-hexene | 1-hexene |
| Haze 23° C. | 3.1 | 5.3 | 3.3 | 5.3 | 3.8 | 5.5 |
| 80° C. for 1 day | 3.1 | 5.4 | 3.3 | 5.5 | 3.9 | 5.6 |
| Gloss | 105 | 90 | 105 | 90 | 100 | 90 |
| Blocking |  |  |  |  |  |  |
| 50° C. for 1 day | 0.05 | 0.32 | 0.02 | 0.25 | 0.10 | 0.41 |
| for 7 days | 0.15 | 0.90 | 0.10 | 0.75 | 0.25 | 1.15 |
| Tear strength MD/TD | 60/105 | 85/115 | 40/80 | 70/90 | 120/160 | 140/180 |
| Impact strength 23° C. | 3000 | 6500 | 800 | 2200 | 3800 | 6600 |
| Complete heat seal temp. | 120 | 105 | 115 | 105 | 120 | 110 |
| Hh/Hl | 0.65 | 0.37 | 0.35 | 0.15 | 0.80 | 0.75 |
| RS | 50 | 76.5 | 20 | 31.4 | 31.7 | 47.1 |
| $-20\log MFR - 1000d + 968$ | 40.2 | 55.4 | — | — | — | — |
| $-20\log MFR - 1000d + 973$ | 45.2 | 60.4 | — | — | — | — |
| $-20\log MFR - 1000d + 975$ | 47.2 | 62.4 | — | — | — | — |

EXAMPLES 3 to 26

To the copolymer obtained in Example 1 were added stabilizers listed in Table 3 in amounts listed in Table 3, and the mixture was pelletized by extruding at 200° C. using an extruder 45 mm in screw diameter.

Films each 420 mm wide and 0.04 mm thick were formed out of the pellets using a commercially available T-die film molding machine equipped with an extruder 65 mm in diameter. The forming was carried out under the following conditions: a resin temperature of 235° C. during molding, a film-forming rate of 20 m/min and a draft ratio of 0.057.

The MFR, film impact strength, heat-resistant and aging-resistant properties and weatherability of the resultant films were evaluated. The evaluation results are shown in Table 4.

TABLE 3

| Example | A | B | C | D | E | F | G | H | I | J | K | L | M |
|---|---|---|---|---|---|---|---|---|---|---|---|---|---|
| Ex. 3 | — | — | — | — | — | — | — | — | — | — | — | — | — |
| Ex. 4 | 0.10 |  |  |  |  |  |  |  |  |  |  |  |  |
| Ex. 5 | — | 0.10 |  |  |  |  |  |  |  | 0.10 |  |  |  |
| Ex. 6 | 0.10 |  | 0.10 |  |  |  |  |  |  | 0.10 |  |  |  |
| Ex. 7 | 0.10 |  |  | 0.10 |  |  |  |  |  | 0.10 |  |  |  |
| Ex. 8 | 0.10 |  |  |  | 0.10 |  |  |  |  | 0.10 |  |  |  |
| Ex. 9 | 0.10 |  |  |  |  |  | 0.10 |  |  | 0.10 |  |  |  |
| Ex. 10 |  |  | 0.10 |  |  |  |  |  |  |  |  |  |  |
| Ex. 11 |  |  | 0.10 |  |  |  |  |  |  | 0.10 |  |  |  |
| Ex. 12 |  |  |  | 0.10 |  |  |  |  |  | 0.10 |  |  |  |
| Ex. 13 |  |  | 0.10 | 0.10 |  |  |  |  |  | 0.10 |  |  |  |
| Ex. 14 |  |  | 0.10 |  |  |  | 0.10 |  |  | 0.10 |  |  |  |
| Ex. 15 |  |  |  |  | 0.10 |  |  |  |  |  |  |  |  |
| Ex. 16 |  |  |  |  | 0.10 |  |  |  |  | 0.10 |  |  |  |
| Ex. 17 |  |  |  |  |  | 0.10 |  |  |  | 0.10 |  |  |  |
| Ex. 18 |  |  |  |  |  |  | 0.10 |  |  | 0.10 |  |  |  |

TABLE 3-continued

| Example | Amount of stabilizer added (part by weight) | | | | | | | | | | | |
|---|---|---|---|---|---|---|---|---|---|---|---|---|
| | A | B | C | D | E | F | G | H | I | J | K | L | M |
| Ex. 19 | | | | | 0.10 | | | 0.10 | | 0.10 | | | |
| Ex. 20 | | | | | | | | 0.10 | | | | | |
| Ex. 21 | | | | | | | | 0.10 | | 0.10 | | | |
| Ex. 22 | | | | | | | | | 0.10 | 0.10 | | | |
| Ex. 23 | | | | | | | | | | 0.10 | | | |
| Ex. 24 | | | | | | | | | | | 0.10 | | |
| Ex. 25 | | | | | | | | | | | | 0.10 | |
| Ex. 26 | | | | | | | | | | | | | 0.10 |

TABLE 4

| Ex- ample | MFR Pellet | MFR Film | Impact strength (kg · cm/cm) | Resistance to heat aging (day) | Weathering resistance (%) |
|---|---|---|---|---|---|
| 3 | 1.6 | 1.2 | 2000 | 15 | 8 |
| 4 | 2.1 | 1.9 | 3000 | 180 | 30 |
| 5 | 2.2 | 2.0 | 3100 | 330 | 35 |
| 6 | 2.2 | 2.1 | 3100 | 220 | 40 |
| 7 | 2.2 | 2.1 | 3100 | 240 | 40 |
| 8 | 2.1 | 2.0 | 3100 | 330 | 35 |
| 9 | 2.1 | 2.0 | 3000 | 280 | 80 |
| 10 | 2.0 | 1.9 | 3000 | 70 | 25 |
| 11 | 2.1 | 2.0 | 3000 | 80 | 30 |
| 12 | 2.1 | 2.0 | 3000 | 90 | 35 |
| 13 | 2.1 | 2.0 | 3000 | 150 | 30 |
| 14 | 2.1 | 2.0 | 3000 | 180 | 65 |
| 15 | 1.9 | 1.6 | 2800 | 50 | 20 |
| 16 | 1.9 | 1.7 | 2800 | 60 | 25 |
| 17 | 1.8 | 1.6 | 2800 | 65 | 25 |
| 18 | 1.9 | 1.7 | 2900 | 80 | 25 |
| 19 | 1.9 | 1.7 | 2900 | 140 | 50 |
| 20 | 1.9 | 1.6 | 2800 | 130 | 55 |
| 21 | 1.9 | 1.7 | 2900 | 150 | 60 |
| 22 | 1.9 | 1.7 | 2900 | 200 | 65 |
| 23 | 1.7 | 1.5 | 2700 | 25 | 20 |
| 24 | 1.7 | 1.5 | 2700 | 30 | 25 |
| 25 | 1.7 | 1.5 | 2700 | 30 | 25 |
| 26 | 1.7 | 1.5 | 2700 | 30 | 30 |

What is claimed is:

1. An ethylene/pentene-1 copolymer which is obtained by copolymerization of ethylene and pentene-1 and fulfills the following requisites (A) to (E):

(A) a melt flow rate of said copolymer as measured according to ASTM D 1238E is in the range of 0.01 to 100 g/10 min;

(B) a density of said copolymer as measured according to ASTM D 1505 is in the range of 0.87 to 0.94 g/cm$^3$;

(C) said copolymer contains constitution units derived from pentene-1 in an amount of 1 to 25 % by weight;

(D) in the case that said copolymer is subjected to cast molding to prepare a film having a thickness of 40 μm, a ratio (RS) of impact strength of the film to tearing strength of the film in the take-off direction of the film satisfies the following formula:

$$RS \geq -20 \log MFR - 1000d + 968$$

wherein MFR represents a melt flow rate of said copolymer, and d represents a density of said copolymer; and (E) in the case that said copolymer is melted at 200° C., then slowly cooled to 50° C. at a cooling rate of 0.31° C./min and crystallized to prepare a sheet sample having a thickness of 0.5 mm, a DSC melt-peak pattern of the sample obtained when the sample is heated from 10° to 200° C. at a heating rate of 10° C./min using DSC has two melt peaks, and a ratio (Hh/Hl) of a height of the peak (Hh) on the higher temperature side to a height of the peak (Hl) on the lower temperature side and the density of said copolymer satisfy the following formula:

$$0 < Hh/Hl < 60d - 52.0$$

wherein Hh represents a peak height on the higher temperature side, Hl represents a peak height on the lower temperature side, and d represents a density of said copolymer.

2. An ethylene/pentene-1 copolymer obtained by copolymerizing at least ethylene and pentene-1 in the presence of an olefin polymerization catalyst formed from a titanium catalyst component in a liquid form comprising a halogen-containing magnesium compound, oleyl alcohol and a titanium compound, and a halogen-containing organoaluminum compound under such conditions that not less than 80 % by weight of the resulting ethylene/pentene-1 copolymer is dissolved in a reaction solvent or melted;

said ethylene/pentene-1 copolymer fulfilling the following requisites (A) to (E):

(A) a melt flow rate of said copolymer as measured according to ASTM D 1238E is in the range of 0.01 to 100 g/10 min;

(B) a density of said copolymer as measured according to ASTM D 1505 is in the range of 0.87 to 0.94 g/cm$^3$;

(C) said copolymer contains constitution units derived from pentene-1 in an amount of 1 to 25 % by weight;

(D) in the case that said copolymer is subjected to cast molding to prepare a film having a thickness of 40 μm, a ratio (RS) of impact strength of the film to tearing strength of the film in the take-off direction of the film satisfies the following formula:

$$RS \geq -20 \log MFR - 1000d + 968$$

wherein MFR represents a melt flow rate of said copolymer, and d represents a density of said copolymer; and (E) in the case that said copolymer is melted at 200° C., then slowly cooled to 50° C. at a cooling rate of 0.31° C./min and crystallized to prepare a sheet sample having a thickness of 0.5 mm, a DSC melt-peak pattern of the sample obtained when the sample is heated from 10° to 200° C. at a heating rate of 10° C./min using DSC has two melt peaks, and a ratio (Hh/Hl) of a height of the peak (Hh) on the higher temperature side to a height of the peak (Hl) on the lower temperature side and the density of said copolymer satisfy the following formula:

$$0 < Hh/Hl < 60d - 52.0$$

wherein Hh represents a peak height on the higher temperature side, Hl represents a peak height on the lower temperature side, and d represents a density of said copolymer.

3. A film formed from the ethylene/pentene-1 copolymer as claimed in claim 1 or claim 2.

4. An ethylene/pentene-1 copolymer composition comprising an ethylene/pentene-1 copolymer (I) and at least one compound (II) selected from the group consisting of a phenolic stabilizer (a), an organic phosphite stabilizer (b), a thioether stabilizer (c), a hindered amine stabilizer (d) and a metal salt of a higher aliphatic acid (e);

said ethylene/pentene-1 copolymer (I) being obtained by copolymerization of ethylene and pentene-1 and fulfilling the following requisites (A) to (E):

(A) a melt flow rate of said copolymer as measured according to ASTM D 1238E is in the range of 0.01 to 100 g/10 min;

(B) a density of said copolymer as measured according to ASTM D 1505 is in the range of 0.87 to 0.94 g/cm$^3$;

(C) said copolymer contains constitution units derived from pentene-1 in an amount of 1 to 25 % by weight;

(D) in the case that said copolymer is subjected to cast molding to prepare a film having a thickness of 40 μm, a ratio (RS) of impact strength of the film to tearing strength of the film in the take-off direction of the film satisfies the following formula:

$$RS \geq -20 \log MFR - 1000d + 968$$

wherein MFR represents a melt flow rate of said copolymer, and d represents a density of said copolymer; and (E) in the case that said copolymer is melted at 200° C., then slowly cooled to 50° C. at a cooling rate of 0.31° C./min and crystallized to prepare a sheet sample having a thickness of 0.5 mm, a DSC melt-peak pattern of the sample obtained when the sample is heated from 10° to 200° C. at a heating rate of 10° C./min using DSC has two melt peaks, and a ratio (Hh/Hl) of a height of the peak (Hh) on the higher temperature side to a height of the peak (Hl) on the lower temperature side and the density of said copolymer satisfy the following formula:

$$0 < Hh/Hl < 60d - 52.0$$

wherein Hh represents a peak height on the higher temperature side, Hl represents a peak height on the lower temperature side, and d represents a density of said copolymer.

5. The ethylene/pentene-1 copolymer composition as claimed in claim 4, wherein said composition comprises 100 parts by weight of the ethylene/pentene-1 copolymer (I) and 0.005–5 parts by weight of the phenolic stabilizer (a).

6. The ethylene/pentene-1 copolymer composition as claimed in claim 4, wherein said composition comprises 100 parts by weight of the ethylene/pentene-1 copolymer (I), 0.005–5 parts by weight of the phenolic stabilizer (a) and 0.005–5 parts by weight of at least one compound selected from the group consisting of the organic phosphite stabilizer (b), the thioether stabilizer (c), the hindered amine stabilizer (d) and the metal salt of a higher aliphatic acid (e).

7. The ethylene/pentene-1 copolymer composition as claimed in claim 4, wherein said composition comprises 100 parts by weight of the ethylene/pentene-1 copolymer (I) and 0.005–5 parts by weight of the organic phosphite stabilizer (b).

8. The ethylene/pentene-1 copolymer composition as claimed in claim 4, wherein said composition comprises 100 parts by weight of the ethylene/pentene-1 copolymer (I), 0.005–5 parts by weight of the organic phosphite stabilizer (b) and 0.005–5 parts by weight of at least one compound selected from the group consisting of the thioether stabilizer (c), the hindered amine stabilizer (d) and the metal salt of a higher aliphatic acid (e).

9. The ethylene/pentene-1 copolymer composition as claimed in claim 4, wherein said composition comprises 100 parts by weight of the ethylene/pentene-1 copolymer (I) and 0.005–5 parts by weight of the thioether stabilizer (c).

10. The ethylene/pentene-1 copolymer composition as claimed in claim 4, wherein said composition comprises 100 parts by weight of the ethylene/pentene-1 copolymer (I), 0.005–5 parts by weight of the thioether stabilizer (c) and 0.005–5 parts by weight of at least one compound selected from the group consisting of the hindered amine stabilizer (d) and the metal salt of a higher aliphatic acid (e).

11. The ethylene/pentene-1 copolymer composition as claimed in claim 4, wherein said composition comprises 100 parts by weight of the ethylene/pentene-1 copolymer (I) and 0.005–5 parts by weight of the hindered amine stabilizer (d).

12. The ethylene/pentene-1 copolymer composition as claimed in claim 4, wherein said composition comprises 100 parts by weight of the ethylene/pentene-1 copolymer (I), 0.005–5 parts by weight of the hindered amine type stabilizer (d) and 0.005–5 parts by weight of the metal salt of a higher aliphatic acid (e).

13. The ethylene/pentene-1 copolymer composition as claimed in claim 4, wherein said composition comprises 100 parts by weight of the ethylene/pentene-1 copolymer (I) and 0.005–5 parts by weight of the metal salt of a higher aliphatic, acid (e).

14. An ethylene/pentene-1 copolymer composition comprising an ethylene/pentene-1 copolymer (I') and at least one compound (II) selected from the group consisting of a phenolic stabilizer (a), an organic phosphite stabilizer (b), a thioether stabilizer (c), a hindered amine stabilizer (d) and a metal salt of a higher aliphatic acid (e);

said ethylene/pentene-1 copolymer being obtained by copolymerizing at least ethylene and pentene-1 in the presence of an olefin polymerization catalyst formed from a titanium catalyst component in a liquid form comprising a halogen-containing magnesium compound, oleyl alcohol and a titanium compound, and halogen-containing organoaluminum compound under such conditions that not less than 80 % by weight of the resulting ethylene/pentene-1 copolymer is dissolved in a reaction solvent or melted, and fulfilling the following requisites (A) to (E):

(A) a melt flow rate of said copolymer as measured according to ASTM D 1238E is in the range of 0.01 to 100 g/10 min;

(B) a density of said copolymer as measured according to ASTM D 1505 is in the range of 0.87 to 0.94 g/cm$^3$;

(C) said copolymer contains constitution units derived from pentene-1 in an amount of 1 to 25 % by weight;

(D) in the case that said copolymer is subjected to cast molding to prepare a film having a thickness of 40 μm, a ratio (RS) of impact strength of the film to tearing strength of the film in the take-off direction of the film satisfies the following formula:

$$RS \geq -20 \log MFR - 1000d + 968$$

wherein MFR represents a melt flow rate of said copolymer, and d represents a density of said copolymer; and (E) in the case that said copolymer is melted at 200° C., then slowly cooled to 50° C. at a cooling rate of 0.31° C./min and crystallized to prepare a sheet sample having a thickness of 0.5 mm, a DSC melt-peak pattern of the sample obtained when the sample is heated from 10° to 200° C. at a heating rate of 10° C./min using DSC has two melt peaks, and a ratio (Hh/Hl) of a height of the peak (Hh) on the higher temperature side to a height of the peak (Hl) on the lower temperature side and the density of said copolymer satisfy the following formula:

$$0 < Hh/Hl < 60d - 52.0$$

wherein Hh represents a peak height on the higher temperature side, Hl represents a peak height on the lower temperature side, and d represents a density of said copolymer.

15. The ethylene/pentene-1 copolymer composition as claimed in claim 14, wherein said composition comprises 100 parts by weight of the ethylene/pentene-1 copolymer (I') and 0.005-5 parts by weight of the phenolic stabilizer (a).

16. The ethylene/pentene-1 copolymer composition as claimed in claim 14, wherein said composition comprises 100 parts by weight of the ethylene/pentene-1 copolymer (I'), 0.005-5 parts by weight of the phenolic stabilizer (a) and 0.005-5 parts by weight of at least one compound selected from the group consisting of the organic phosphite stabilizer (b), the thioether stabilizer (c), the hindered amine stabilizer (d) and the metal salt of a higher aliphatic acid (e).

17. The ethylene/pentene-1 copolymer composition as claimed in claim 14, wherein said composition comprises 100 parts by weight of the ethylene/pentene-1 copolymer (I') and 0.005-5 parts by weight of the organic phosphite stabilizer (b).

18. The ethylene/pentene-1 copolymer composition as claimed in claim 14, wherein said composition comprises 100 parts by weight of the ethylene/pentene-1 copolymer (I'), 0.005-5 parts by weight of the organic phosphite stabilizer (b) and 0.005 to 5 parts by weight of at least one compound selected from the group consisting of the thioether stabilizer (c), the hindered amine stabilizer (d) and the metal salt of a higher aliphatic acid (e).

19. The ethylene/pentene-1 copolymer composition as claimed in claim 14, wherein said composition comprises 100 parts by weight of the ethylene/pentene-1 copolymer (I') and 0.005-5 parts by weight of the thioether stabilizer (c).

20. The ethylene/pentene-1 copolymer composition as claimed in claim 14, wherein said composition comprises 100 parts by weight of the ethylene/pentene-1 copolymer (I'), 0.005-5 parts by weight of the thioether stabilizer (c) and 0.005-5 parts by weight of at least one compound selected from the group consisting of the hindered amine stabilizer (d) and the metal salt of a higher aliphatic acid (e).

21. The ethylene/pentene-1 copolymer composition as claimed in claim 14, wherein said composition comprises 100 parts by weight of the ethylene/pentene-1 copolymer (I') and 0.005-5 parts by weight of the hindered amine stabilizer (d).

22. The ethylene/pentene-1 copolymer composition as claimed in claim 14, wherein said composition comprises 100 parts by weight of the ethylene/pentene-1 copolymer (I'), 0.005-5 parts by weight of the hindered amine stabilizer (d) and 0.005-5 parts by weight of the metal salt of a higher aliphatic acid (e).

23. The ethylene/pentene-1 copolymer composition as claimed in claim 14, wherein said composition comprises 100 parts by weight of the ethylene/pentene-1 copolymer (I') and 0.005-5 parts by weight of the metal salt of a higher aliphatic acid (e).

24. The ethylene copolymer of claim 1 wherein said copolymer comprises 75 to 99% by weight of a constitution unit derived from ethylene.

25. The ethylene copolymer of claim 1 wherein said copolymer comprises 6 to 20% by weight of a constitution unit derived from pentene-1 and 80 to 94% by weight of a constitution unit derived from ethylene.

26. The ethylene copolymer of claim 2 wherein said copolymer comprises 75 to 99% by weight of a constitution unit derived from ethylene.

27. The ethylene copolymer of claim 2 wherein said copolymer comprises 6 to 20% by weight of a constitution unit derived from pentene-1 and 80 to 94% by weight of a constitution unit derived from ethylene.

* * * * *